United States Patent [19]
Appel

[11] Patent Number: 5,456,408
[45] Date of Patent: Oct. 10, 1995

[54] ENGINE-INDEPENDENT MOTOR VEHICLE HEATING DEVICE WITH FUEL-AIR RATIO CONTROL

[75] Inventor: Josef Appel, Gauting, Germany

[73] Assignee: Webasto Thermosysteme GmbH, Stockdorf, Germany

[21] Appl. No.: 220,493

[22] Filed: Mar. 31, 1994

[30] Foreign Application Priority Data

Apr. 3, 1993 [DE] Germany .......................... 43 11 080.0

[51] Int. Cl.⁶ .................................................. G05D 23/00
[52] U.S. Cl. ...................................... 237/2 A; 237/12.3 C
[58] Field of Search ................................ 237/2 A, 12.3 C

[56] References Cited

U.S. PATENT DOCUMENTS

| | | | |
|---|---|---|---|
| 2,551,823 | 5/1951 | Buttner et al. | 237/12.3 C X |
| 4,411,385 | 10/1983 | Lamkewitz | 237/12.3 C X |
| 4,439,095 | 3/1984 | Galtz et al. | 415/52 |
| 4,613,072 | 9/1986 | Kikuchi et al. | 237/12.3 C |
| 4,852,797 | 8/1989 | Goerlich | 237/12.3 C X |
| 4,892,476 | 1/1990 | Kawamura | 237/12.3 C X |
| 4,915,615 | 4/1990 | Kawamura et al. | 237/12.3 C X |
| 4,946,097 | 8/1990 | Kawamura | 237/12.3 C X |
| 5,211,333 | 5/1993 | Schmalenbach et al. | 237/12.3 C X |
| 5,222,661 | 6/1993 | Wenhart | 237/12.3 C X |

FOREIGN PATENT DOCUMENTS 4140804  3/1993  Germany .

*Primary Examiner*—William E. Tapolcai
*Attorney, Agent, or Firm*—Sixbey, Friedman, Leedom & Ferguson; David S. Safran

[57] ABSTRACT

A motor vehicle heating device which is operable independent of an engine of the motor vehicle and has a burner, a pump or other fuel delivery device for supplying fuel to the burner and an electric motor driven blower by which combustion air is delivered to the burner. In contrast to conventional heating devices in which the fuel-air ratio is set and corrected via a mechanically adjustable bypass screw on the combustion air blower, according to a preferred embodiment of the invention, a correction value is sent to a control device which contains a nonvolatile data storage and a microprocessor; the correction value is stored in the data storage and changes the output signals of the control device to the fuel feed means and/or to the combustion air blower. Thus, adjustment and correction are easily enabled via an electronic change of the speed or cycle frequency of these assemblies, so that mechanical adjustment devices can be omitted.

12 Claims, 3 Drawing Sheets

ENGINE-INDEPENDENT MOTOR VEHICLE HEATING DEVICE WITH FUEL-AIR RATIO CONTROL

BACKGROUND OF THE INVENTION

1. Field of the Invention

The invention relates to a motor vehicle heating device which is independent of the vehicle engine and having burner to which metered quantity of fuel combustion air is delivered. In particular, the invention relates to such a heating device where the combustion air is delivered by means of a blower driven by an electric motor and in which the amount of combustion air and/or fuel is adjustable, and where operation of the heating device is controlled by a control device which contains a nonvolatile data storage and a microprocessor.

2. Description of Related Art

A generic motor vehicle heating device is known from U.S. Pat. No. 4,439,095. In addition to a fuel pump which is used as a means for metered delivery of fuel, each heating device also has an electric motor-driven combustion air blower on which an adjustable bypass screw is provided as a means for changing the amount of combustion air delivered. These setting screws are used in combustion air blowers to equalize production-induced tolerances on the assemblies involved in combustion and to correct the fuel-air ratio to achieve legally prescribed threshold values, for example, for $CO_2$ content in the exhaust gas. Mechanical adjustment of a correction valve for the fuel-air ratio of this type is awkward, on the one hand, and on the other, generally, not very exact due to the positioning force to be applied to overcome the self-locking of the setting screw.

SUMMARY OF THE INVENTION

Thus, the primary object of the present invention is to devise a simplified adjustment and correction mechanism for adjusting the fuel-air ratio of a motor vehicle heating device.

This object is achieved according to a preferred embodiment of the invention by provision of a correction value which can be delivered to the control device via at least one input, the correction value being stored in the data storage and changing the output signals of the control device to fuel feed means and/or combustion air blower which determine their speed or cycle frequency.

In this embodiment, a correction value is delivered to the control device via at least one input; the correction value is stored in the data storage of the control device and it changes the output signals of the control device to the fuel feed means and/or to the combustion air blower, the output signals determining their speed or cycle frequency. Thus, according to the present invention, an electronic control device, which is present anyway in modern motor vehicle heating devices, is used to transfer a measured correction value which is formed first from the production tolerances of a certain heating device and then to continuously take it into account in the control program. Thus, correction of the fuel-air ratio is enabled with elimination of all mechanical adjustment means which would require an additional construction cost.

In the preferred embodiment of the invention, the correction value is read into the corresponding data storage via a serial interface. This type of transfer of a correction value to a control device is especially advantageous for the initial factory setting. In this regard the corresponding correction value can also be transmitted, for example, in end-of-line (EOL) programming, as is known in principle from commonly owned German Patent DE 41 40 804 C1 as a hardware-specific parameter with the other program parts and data necessary for control of the heating device. That is, by end-of-line programming it is meant that correction value data is input into a memory area via an external interface after all other data has been input.

An alternative or additional feature is that the correction value can be adjusted by means of a potentiometer, its adjustable analog current or voltage value being recorded by an analog/digital converter and read into the data storage. Since modern microprocessors which are used for control purposes generally also contain at least one A/D converter part, aside from the adjustable potentiometer, no additional construction cost is required to obtain this feature.

A potentiometer of this type is preferably located on a board of the control device which, in one especially advantageous embodiment, is located directly under a cover located detachably on the housing. Thus, correction is also easily possible for an installation shop or technical end user when degraded useful outputs occur during routine operation due to wear.

To input the correction values by means of a serial interface, when using a control device as is known in principle from the aforementioned German Patent DE 41 40 804 C1, no additional construction cost is necessary either, since the serial interface is already present there, both for the inputting of data and for reading out of operating parameters using a diagnosis device. In this configuration, it is advantageous if the correction value is input by means of a preferably portable diagnosis device.

Finally, it is advantageous for a motor vehicle heating device which can be operated in several load stages that the data storage stores specific correction values for each of the load stages. In this way, the characteristics of a fuel pump or combustion air blower which is nonlinear in practice can be taken into account, as can the circumstance that production-induced tolerances require different correction values at different load points. In a heating device which can be continuously controlled (i.e., is infinitely adjustable) in a certain power range, this can be taken into account, accordingly, by reading out a correction value from a stored family of characteristics.

These and further objects, features and advantages of the present invention will become apparent from the following description when taken in connection with the accompanying drawings which, for purposes of illustration only, show a single embodiment in accordance with the present invention.

DETAILED DESCRIPTION OF THE PREFERRED EMBODIMENT

Figure 1:
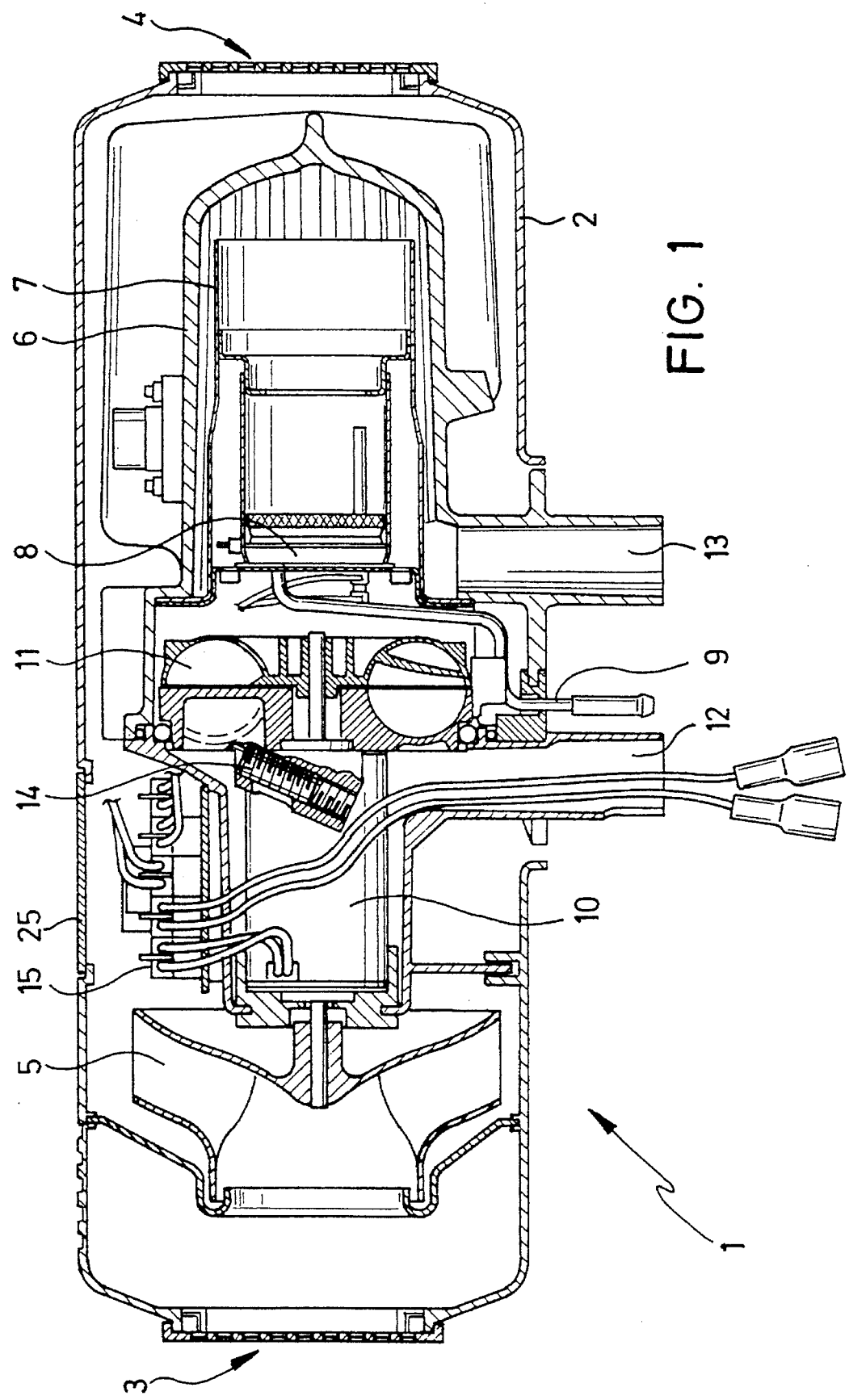
FIG. 1 shows a longitudinal sectional side view of a motor vehicle heating device in accordance with the present invention.

A motor vehicle heating device, designated 1 as a whole, shown in FIG. 1 is, in this example, an air heating device. However, for this invention, motor vehicle heating devices which are connected into a coolant circuit, i.e., heaters in which water or another liquid coolant serves as a heat exchange medium, are equally well suited.

Figure 3:
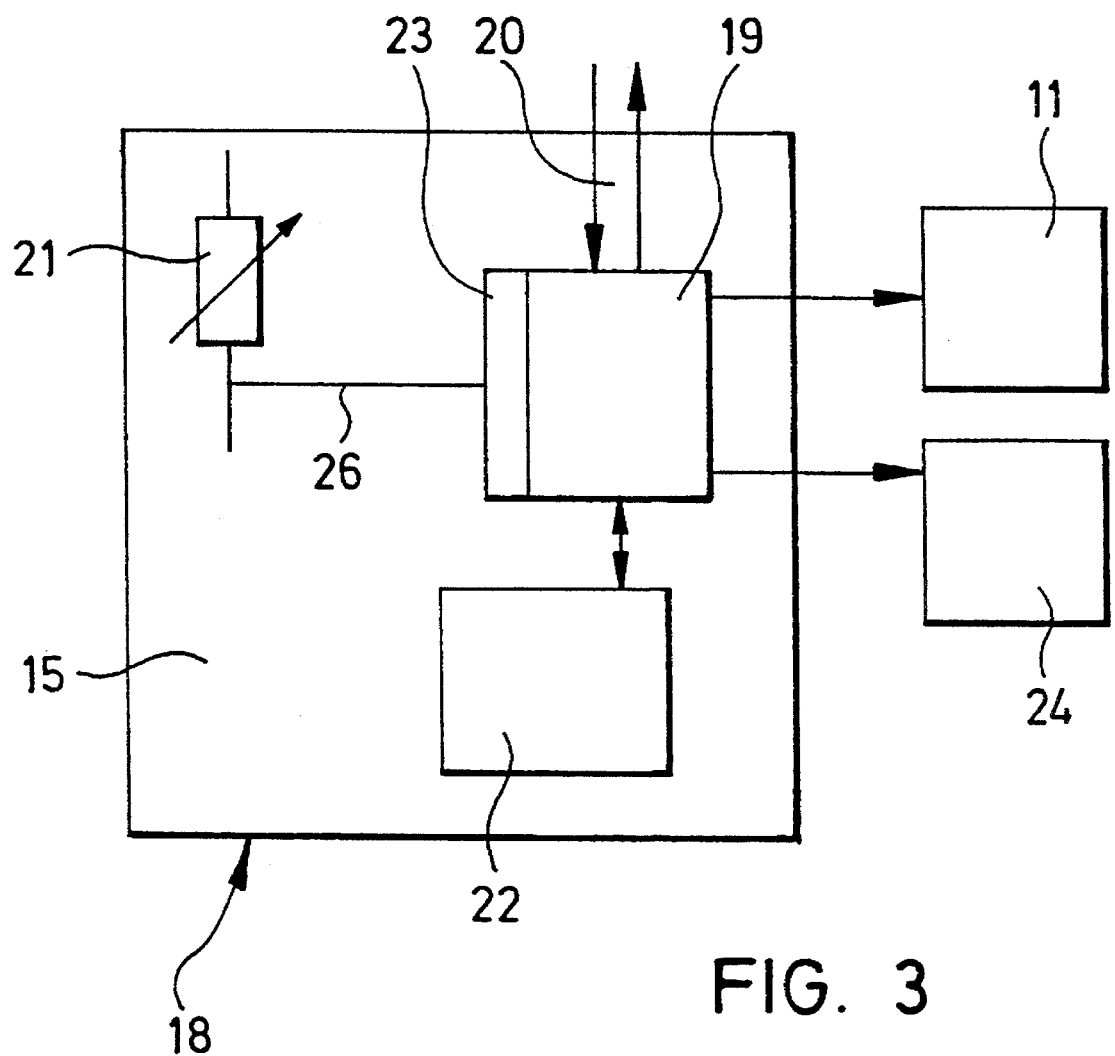
FIG. 3 shows a schematic of the controlling device.

The motor vehicle heating device 1 has a housing 2 with an inlet opening 3 at one end and an outlet opening 4 at its opposite end. Within housing 2, a hot air blower 5 is provided for supplying air for heating the motor vehicle interior (not shown), this heating air having been warmed by passage through a heat exchanger 6. The energy required to heat the exchanger 6 is withdrawn from the hot combustion gases, generated by the burner 8, in heating chamber 7. Fuel is sent to burner 8 from a fuel pump 24 (schematically depicted in FIG. 3) via fuel line 9, and combustion air is delivered to burner 8 by means of a combustion air blower 11. The fuel-air mixture which is formed is ignited by an ignition means which is not shown in greater detail and the resulting hot exhaust gases leave heating device 1 after heating heat exchanger 6 via exhaust gas connection 13. The combustion air delivered by combustion air blower 11 is sucked in via intake manifold 12.

To illustrate the adjustment of the output of combustion air blower 11 used in conventional heating devices, a bypass screw 14 is shown in FIG. 1. By moving bypass screw 14, it opens or blocks, to a greater or lesser degree, a bypass channel which connects the delivery side to the intake side of blower 11. A bypass screw 14 of this type is not required in a heating device according to the invention, despite its representation in FIG. 1. Combustion air blower 11 and hot air blower 5 are driven by an electric motor 10. The speed of electric motor 10 can be controlled by a control device 18; when a magnetic pump is used as a fuel pump 24, the same is true with respect to the cycle frequency of the pump.

Figure 2:
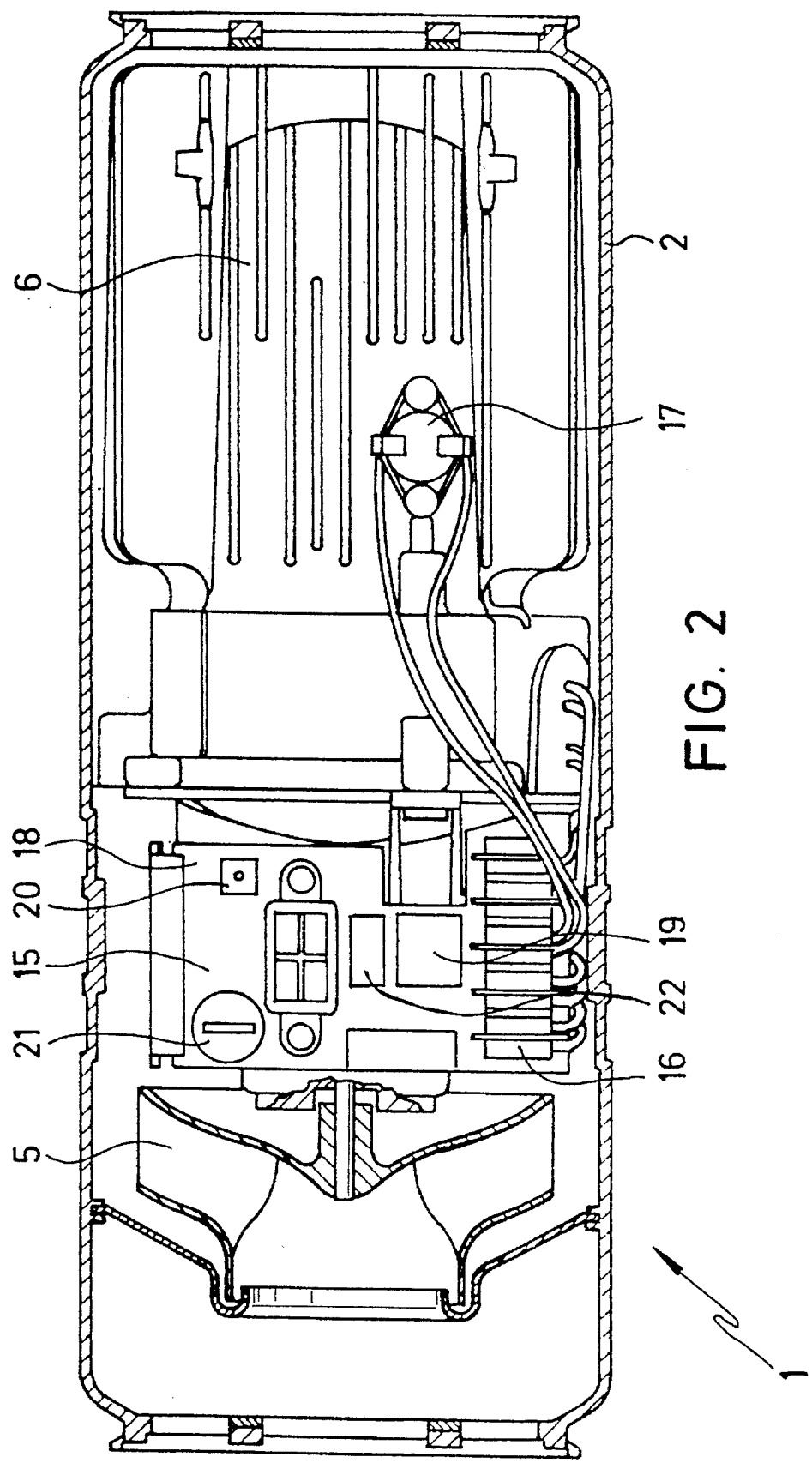
FIG. 2 shows a plan view of the motor vehicle heating device according to FIG. 1 after removal of the upper housing part.

The parts required to control the heating device are combined in control device 18 on a board 15. Control device 18 contains a microprocessor 19 in which an analog/digital converter part 23 is integrated. A voltage signal of an adjustable potentiometer 21 is sent via input 26 to this analog/digital converter part 23. Microprocessor 19 can furthermore be connected to peripherals by serial interface 20 for an input and output of data and programs. Microprocessor 19 is also connected to a data storage 22, into which data are written and from which data can be read out. Data storage 22 is designed as a nonvolatile storage, i.e., the items of data stored therein are preserved even when the power supply voltage is turned off. Microprocessor 19 controls the speed of blower 11 and the speed or cycle frequency of fuel pump 24. For purposes of simplification, all other inputs and outputs of control device 18 are omitted in FIG. 3; they are necessary for the overall operation of the heating device, however they play no role in this invention. As an example of this, the connection of a temperature detector 17 shown in FIG. 2 to board 15 by means of cables and a plug connector 16 is noted.

To be able to easily undertake subsequent correction of a parameter relevant to the fuel-air ratio, such as the speed of fan 11 or fuel pump 24, cover 25 is illustrated in FIG. 1 on housing 2; after its removal, the potentiometer 21 is freely accessible.

The operation of heating device 1 is described below. After motor vehicle heating device 1 has been installed, in final form, in the factory and control device 18 has been supplied with the program parts and data relevant to the pertinent heating device via serial interface 18, based on an inspection report, a correction value characteristic of a certain motor vehicle heating device due to inevitable production tolerances is added to these data via end-of-line programming of control device 18 (in the manner noted above relative to commonly owned German Patent DE 4140 804 C1, or in one version, via adjustment of potentiometer 21.

For an adjustment via potentiometer 21, the analog input value of potentiometer 21, which is determined by A/D converter 23, is converted into a digital value, is conditioned in microprocessor 19 according to a routine stored there, and then is transmitted to storage 22. In the same way, digital values transmitted via serial interface 20 are transmitted from microprocessor 19 to data storage 22.

When the motor vehicle heating device 1 is operating, a correction value of this type is continually taken into account, either as an alternative to a standard value transferred in the programming or as a correction value to be added to a standard value of this type. Based on the effective correction value which is formed alone or in addition to a standard value, control device 18 outputs values, corrected via microprocessor 19, for the speed of blower 11 and/or for the speed or cycle frequency of fuel pump 24.

If a value which deviates from the prescribed value for $CO_2$ content of the exhaust gas should be formed when the heating device is inspected, these speed values can be corrected either by the shop using a portable diagnosis device via serial interface 20 or these values are corrected manually via adjustable potentiometer 21. Regardless of the selected correction version, mechanical bypass screw 14 for correction of the fuel-air ratio can be omitted, as a result of which the housing of blower 11 is structurally simplified, and becomes lighter and cheaper.

In a motor vehicle heating device which can be operated in several load stages, for each load stage, specific correction values are determined by final inspection on a test stand and are filed in data storage 22 in the aforementioned manner via microprocessor 19. While only one correction value for the fuel-air ratio in all possible load stages can be set by means of a mechanical bypass screw, a correction value which guarantees appropriate, allowable exhaust gas values can be input for each operating state by the correction which takes place electronically according to the invention.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Motor vehicle heating device of the type which is operable independent of a vehicle engine and comprising a burner, fuel supply means for the delivery of a metered quantity of fuel to the burner, an electric motor operated combustion air blower means for delivering combustion air to the burner, and a control device which contains a nonvolatile data storage having initial data values for controlling operation of a specific type of heating device stored therein and a microprocessor; wherein said control device forms an adjustment means for changing the relative quantity of combustion air and fuel received by the burner; wherein at least one means for inputting a correction value to the control device is provided for changing the data values initially stored in the nonvolatile data storage for compensating for production tolerances of the actual heating device of which it forms a part; and wherein said control device has output means for delivering output signals to at least one of the fuel supply means and the combustion air blower means based on the data values stored in the nonvolatile data storage, said output values determining the rate of operation of said at least one of the fuel supply means and the combustion air blower means.

2. Motor vehicle heating device according to claim 1, wherein said means for inputting the correction value comprises a serial interface.

3. Motor vehicle device according to claim 2, wherein the means for inputting the correction value comprises a potentiometer, and an analog/digital converter.

4. Motor vehicle heating device according to claim 3, wherein the analog/digital converter is integrated in the microprocessor.

5. Motor vehicle heating device according to claim 3, wherein the potentiometer is located on a board of the control device.

6. Motor vehicle heating device according to claim 2, wherein the serial interface also forms a means for reading out operating parameters of the heating device via a diagnostic device.

7. Motor vehicle heating device according to claim 6, wherein the means for inputting comprises the diagnostic device.

8. Motor vehicle heating device according to claim 4, wherein the heating device is operable in several load stages; and wherein said data storage stores specific correction values for each of the load stages.

9. Motor vehicle device according to claim 1, wherein the means for inputting the correction value comprises a potentiometer, and an analog/digital converter.

10. Motor vehicle heating device according to claim 9, wherein the analog/digital converter is integrated in the microprocessor.

11. Motor vehicle heating device according to claim 9, wherein the potentiometer is located on a board of the control device.

12. Motor vehicle heating device according to claim 1, wherein the heating device is operable in several load stages; and wherein said data storage stores specific correction values for each of the load stages.

* * * * *